Jan. 27, 1953 S. B. WILLIAMS 2,626,752
CARRY DEVICE FOR ELECTRONIC CALCULATORS
Filed Nov. 23, 1949 5 Sheets-Sheet 1
FIG. 1.
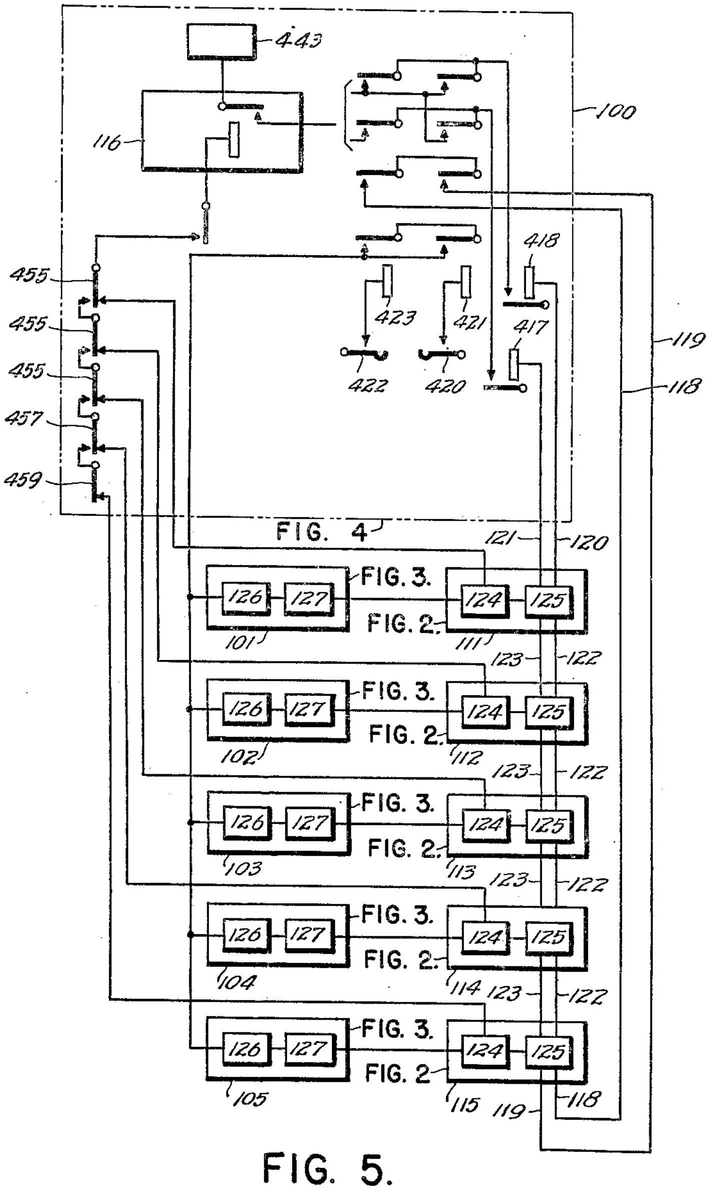
FIG. 4, FIG. 3., FIG. 2.
FIG. 5.
Samuel B. Williams
INVENTOR Jan. 27, 1953 S. B. WILLIAMS 2,626,752

CARRY DEVICE FOR ELECTRONIC CALCULATORS

Filed Nov. 23, 1949 5 Sheets-Sheet 2

Samuel B. Williams
INVENTOR

Samuel B. Williams
INVENTOR

Jan. 27, 1953 S. B. WILLIAMS 2,626,752

CARRY DEVICE FOR ELECTRONIC CALCULATORS

Filed Nov. 23, 1949 5 Sheets-Sheet 4

TO ADDING CIRCUIT FIG. 2A.

TO RECORDING CIRCUIT FIG. 4.

Samuel B. Williams

INVENTOR

Jan. 27, 1953 S. B. WILLIAMS 2,626,752

CARRY DEVICE FOR ELECTRONIC CALCULATORS

Filed Nov. 23, 1949 5 Sheets-Sheet 5

Samuel B. Williams
INVENTOR

Patented Jan. 27, 1953

2,626,752

UNITED STATES PATENT OFFICE 2,626,752

CARRY DEVICE FOR ELECTRONIC CALCULATORS

Samuel B. Williams, Chevy Chase, Md., assignor to The National Cash Register Company, Dayton, Ohio, a corporation of Maryland Application November 23, 1949, Serial No. 128,985

23 Claims. (Cl. 235—133)

This invention relates to calculating devices and the like, particularly to the electrical operation of such devices by electronic methods. This patent application is a continuation-in-part of my pending patent application No. 60,661, filed November 18, 1948, now abandoned.

A calculator should be provided with means for introducing and adding numbers, designating and controlling the arithmetical operation to be performed and for displaying the result. The calculator includes an accumulator composed of a number of counters, one for each denominational order or digital position, which are related to each other from the lowest to the highest order, or from right to left, by a carry device. An electronic accumulator may comprise a plurality of counters, in each of which the pulses representing digital values are counted by tubes arranged in a closed ring, and when the count advances beyond a predetermined point in the ring, a carry to the next left counter is required. Generally, such electronic counters include a number of "on" and "off" tube combinations so arranged that each pulse advances the "on" combination one step, shutting off one "on" combination and operating the next combination from "off" to "on." These tube combinations are usually some form of trigger circuit.

One principle, upon which the operation of electronic calculating devices may be based, employs a master clock or other pulse producing mechanism for synchronizing the various operations involved. In calculating devices employing such arrangements, a definite time is allotted for each operation and the time required for making an addition is independent of the values of the digits to be added and is governed entirely by the master clock.

One of the features of this invention is to provide a calculating device which is independent of any common timing or pulsing mechanism and in which each counter for a denominational order of the accumulator may perform its function in such time as may be required without relation to the other counters. This arrangement eliminates the master clock and permits the counters to operate in their own time instead of a predetermined time controlled by a master timing mechanism. When a master clock is used, the carry from one counter to the next is provided for by a special part of the timing cycle. This adds to the total time required in completing the addition.

Another feature of this invention resides in the use of two carry signals, one of which indicates to the counter of the next higher denominational order that the addition in the next lower denominational order is completed and that the sum resulting from that addition does not exceed a predetermined amount and no carry is required.

This may be called a "carry-of-zero." The other carry signal indicates to the counter of the next higher denominational order that the addition in the lower denominational order is completed and that the sum resulting from that addition exceeds a predetermined amount and requires the addition of "one" to the amount in the next higher denominational order of the accumulator. This may be called a "carry-of-one."

According to this invention the digits are added in all the counters simultaneously. Each counter completes its addition independently of the others. This necessitates an indication of some sort when a counter has completed its addition. Provision must also be made to prevent an in-carry of one from interfering with the addition and, nevertheless, to be added to the sum.

Thus, according to this invention, a carry device is provided to register the completion of the addition made by the counter, with which it is associated and to register one of the two in-carry signals when it is received from the counter of the next lower denominational order in the accumulator. Furthermore, the carry device is rendered operative only after both registrations have been made.

A feature of the carry circuit provides for the registration of the addition-completion signal from the adding tubes of the counter with which it is associated and the registration of the in-carry signal from the counter of the next lower denominational order, each independently of the other. When both registrations are made, the carry circuit proceeds to add one to the sum resulting from the addition, if an in-carry of one has been registered, and to transmit an out-carry-of one or an out-carry-of-zero depending upon the sum resulting from the final addition over one of two conductors connecting to the counter of the next higher denominational order for registration in that counter. If an in-carry-of-zero had been registered, the carry circuit does not add one to the sum but immediately transmits on out-carry signal, depending upon the sum resulting from the addition, to the counter of the next higher denominational order in the accumulator.

A feature of the invention is the registration of the addition-completion and in-carry signals in such a manner that either may be registered before the other and the carry circuit is rendered operative only when the last signal is registered. Thus, the carry circuit does not operate until both signals are registered.

Another feature of the invention resides in the resetting of the carry circuits associated with all the counters in the accumulator when the calculator completes the addition. This arises due to the two register elements required for the two in-carry signals. Each such register element is arranged to register a particular in-carry signal.

The addition-completion signal is registered in both of them. At the completion of the calculation, one of the register elements will be only half operated by the addition-completion signal prior to or after the registration of the in-carry signal and that element must be reset or restored to a normal non-operated condition before another addition can be made.

The digital value to be added is introduced into the accumulator by the operation of a key which records the value on associated key set tubes. The calculation is started by the operation of one of the common "add" or "subtract" keys. A starting pulse is transmitted to the adding tubes in the counter with which the key set is associated, and the operation of the adding tubes creates a counting pulse which is returned to the key set counting tubes. The operation of the key set counting tubes creates a new adding pulse which is transmitted to the adding tubes and this operation continues until the key set counting tubes are "satisfied" by counting down to zero. The operation of a key operates a corresponding counting tube from which the count to zero is the digital value represented by the key. When the zero counting tube is operated, the counting pulses are stopped and the addition-completion signal is registered in the carry circuit associated with the counter to notify the carry circuit that the addition is completed.

The above-mentioned and other features and objects of this invention and the manner of attaining them will become more apparent and the invention itself will be best understood, by reference to the following description of one embodiment of the invention taken in conjunction with the accompanying drawings, wherein:

Fig. 1 shows a block diagram of an electronic calculator arranged for addition and subtraction.

Fig. 5 shows the arrangement of Figs. 2A, 2B, 3, and 4 for tracing circuit operation.

Figure 2A:
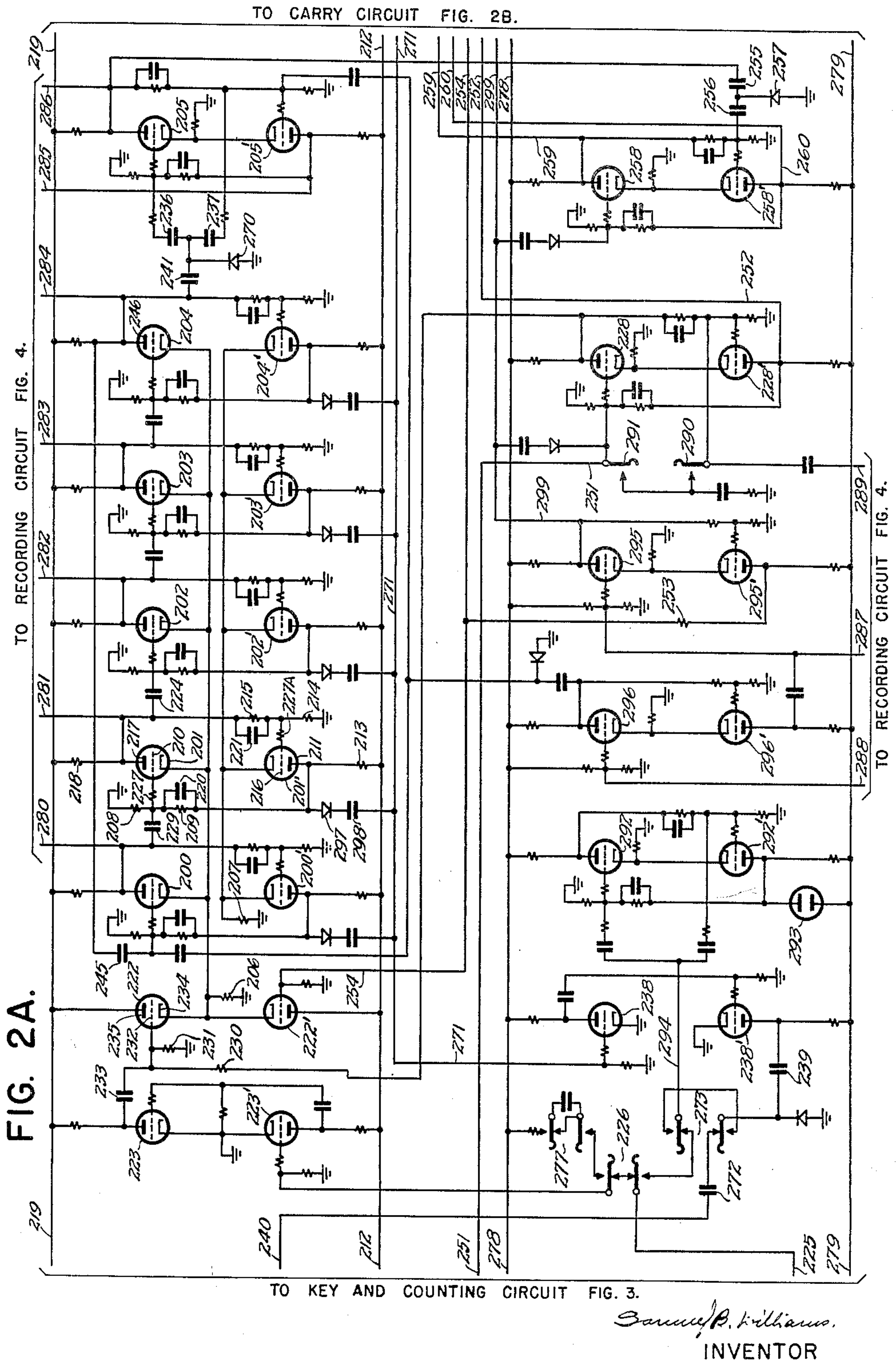
Fig. 2A shows the adding and control circuits of a counter.

In an electronic calculator, tubes are employed as relays which operate or release to perform circuit functions. A convenient method for obtaining this relay-like operation is to employ two tubes in a trigger circuit, such as the Eccles-Jordan trigger circuit, in such a manner that, when one tube becomes conducting, it forces its mate tube to assume a non-conducting state. The tubes are connected in a resistance network such that when either tube becomes conducting and the other tube becomes non-conducting, both tubes are locked in such states until an external pulse or potential is applied, which causes them to reverse their conditions and the one tube which was non-conducting becomes conducting while the other tube which was conducting becomes non-conducting. The theory and operation of trigger circuits of this nature is more fully explained in the second edition of "Theory and Applications of Electronic Tubes" by Herbert J. Reich, McGraw-Hill Book Company, 1944, in chapter 10 on page 349 and more particularly in paragraph 10—4 beginning on page 353.

The tubes employed in this calculator have only two states or conducting conditions, they are either "off" or "on," which correspond to the non-conducting and conducting conditions, respectively, of the tubes in the usual sense. When a tube is "released" or "turned off," it is changed from a conducting to a non-conducting state and when the tube is "operated" or "turned on" it is changed from a non-conducting to a conducting state. It will be helpful to a further understanding of the description to realize that when a tube is turned off, the potential of the plate or anode, with respect to ground, is increased and when it is turned on, this potential is decreased, because, as shown in the drawings, the cathode is connected to the ground pole of the high tension battery and the anode is connected through a resistance to the other pole of the battery.

Pulses may be produced by changing the condition of the tube. The change need not be a complete swing from full to no conduction. A positive pulse may be created by merely decreasing the amount of conduction because when the resulting change in the anode potential is passed through a condenser, the actual potentials are erased beyond the condenser and the value of the pulse resides only in the amount of the change in the potential at the plate. The same applies to the production of a negative pulse. In this case the conduction of the tube is increased and the consequent decrease in anode potential is passed through a condenser, the value of the pulse being related to the amount of the change in the potential at the anode or plate of the tube creating it.

The drawings show the two tubes of a pair, one above the other. The upper tube is not "primed" and the lower tube is "primed." When the pair of tubes is a trigger pair, such as the binary pair in Fig. 2A, they are designated 205 and 205'. The pulse amplifiers are likewise pairs of tubes such as 223 and 223'. This tends to a simplification in tracing the circuit. Tubes may be "conditioned" to operate or not to operate by changing the grid bias potential or by changing the potential of the cathode relative to the grid. An example of such conditioning will be found at tubes 262' and 265' in Fig. 2B, the operation of which will be described later.

In this description, the "accumulator" is that unit of a calculator that does the adding and holds the results of a calculation. An accumulator comprises a plurality of "counters," one for each denominational order. A counter is required to add the value of one digit or denominal order to the value held in the adding part of the counter and to receive carry signals from the counter of the next right hand denominational order and to transmit signals indicative of a carry to the counter of the next left hand denominational order. The manner of performing these functions will be described later.

GENERAL DESCRIPTION

Referring now to Fig. 1, the boxes show the various elements comprising a five place electronic calculator arranged for addition and subtraction. The common element 100 includes a printer 443, on which values resulting from the addition may be printed, digit by digit, under control of progress relays 455, 457 and 459 and translating relays 116. Key 420, with its associated relay 421, controls the process of addition. Key 422, with its associated relay 423, controls the process of subtraction.

The drawing shows five key set circuits 101 to 105 and associated counter circuits 111 to 115 to provide for a five place number. The adding tubes 124 of each counter are connected through the progress relays 455, 457 and 459 to translating relays 116 to operate the printer 443 to print the digits represented by the adding tubes. Digit keys 126 are operated to introduce the values of the digits into the calculator. These keys 126 operate corresponding counting tubes 127 which transmit a number of pulses to the adding tubes 124 corresponding to the operated key of the key set 126. The carry circuit 125 is operated when both the addition is completed in the adding tubes 124 and the in-carry signal pulse over conductor 122 or 123 from the counter of the next lower denominational order are registered to transmit an out-carry signal pulse over conductor 122 or 123 to the counter of the next higher denominational order.

An initial carry condition is placed on the counter 115 of the lowest denominational order in the accumulator from the addition or subtraction relay 421 or 423 over conductor 118 or 119. The final carry from the counter 111 of the highest denominational order in the accumulator is passed over conductor 120 or 121 and through suitable circuit elements to operate relay 417 or 418 to control the translation of the result for printing. Each counter is connected to the counter of the next higher denominational order by the two carry conductors 122 and 123.

The calculator of Fig. 1 is arranged for addition or subtraction only and the numbers are introduced one at a time. A number is introduced by operating the digit keys 126 corresponding to the numerical digits. The accumulator is set to zero and the first number is entered by first operating the keys of the various key sets and then operating the add key 420. When the addition is completed, the carry circuit is reset and other numbers may be added without setting the accumulator to zero. The result is not printed unless a key, not shown in Fig. 1, is operated. When this key is operated the number then held in the adding tubes of the accumulator is printed before the reset occurs. Thus, it is possible to add several numbers without printing and, by the operation of the key, print the accumulated sum at the end of the last addition.

Subtraction is effected by adding the ten's complement of the number. However, the manipulation of the keyboard is the same for subtraction as it is for addition with the exception that the subtract key 422 instead of the add key 420 is operated. Thus, it is possible to add and subtract successively by merely entering the number on the digit keys and operating the add or subtract key. Subtraction is accomplished by introducing the nine's complement of all the digits, into the calculator. The operation of the subtract key introduces a carry of one into the counter of the lowest denominational order in the accumulator. This addition of one to the nine's complement results in adding the ten's complement in the lowest order counter and thus fulfills the requirement of a ten's complement in which all the digits, from the highest to the next to lowest denomination, are nine's complements and the lowest denomination is the ten's complement.

It may happen on subtraction that the difference held in the accumulator is a negative number, in which case it will be the ten's complement of the negative difference. The carry from the left hand or highest denominational order counter in the accumulator is passed to the common equipment and, when a carry of zero, signifying a negative difference, is introduced into the common element and the subtract relay is operated, the number in the accumulator is automatically complemented so that the true value of the difference is printed rather than the complement of that value.

The accumulator is initially set to zero by the operation of a zero key, not shown in Fig. 1, associated with the common control element 100. A number to be added is set up on the digit keys 126 and add key 420 is operated. When the addition is completed, relay 417 or 418 is operated, and the carry circuits in the accumulator is reset unless the printing key is operated. When the printing key is operated, the number held in the accumulator is printed on printer 443 before the carry circuits are reset. The addition of other numbers may be continued as long as the accumulated sum does not exceed the capacity of the calculator.

For subtraction, instead of the add key 420, the subtract key 422 is operated after the number has been set up on the digit keys 126. When the computation is completed and the final result is printed, the accumulator may be set to zero by the operation of the common zero key.

OPERATION OF COUNTER CIRCUIT

Figure 2B:
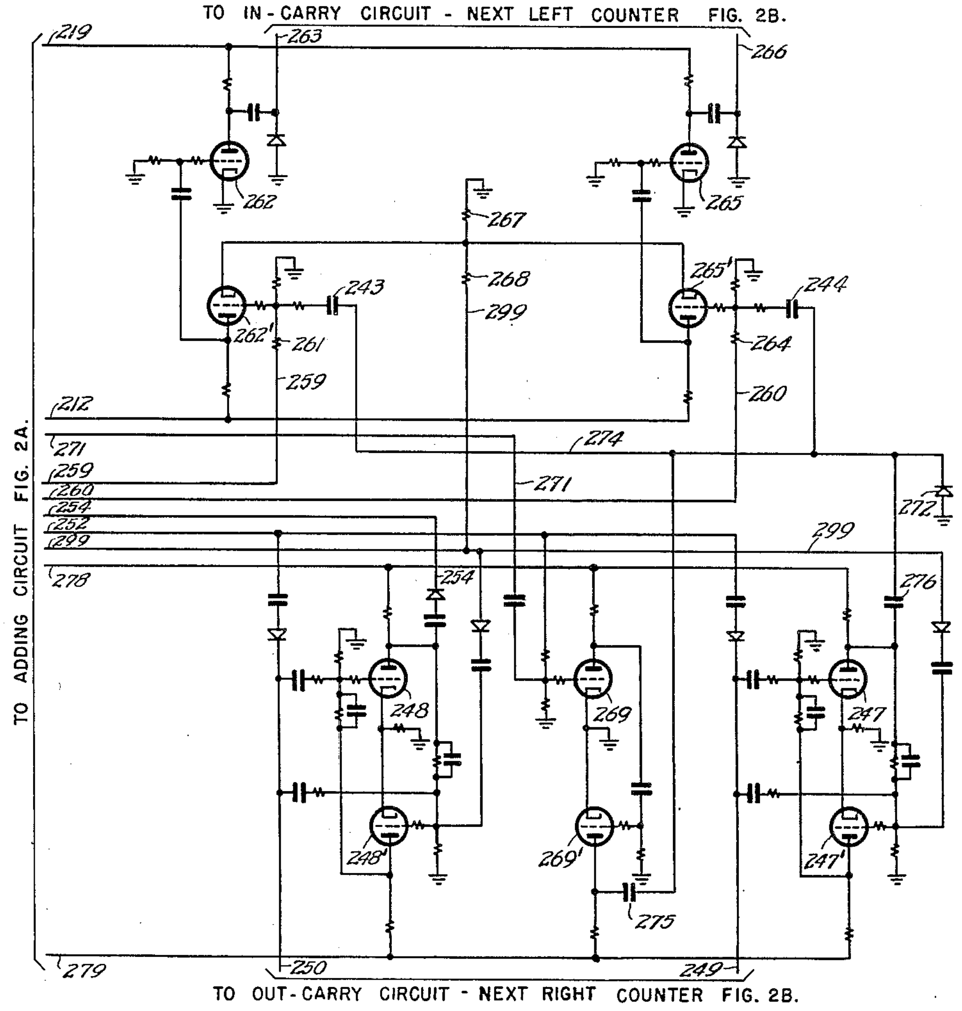
Fig. 2B shows the carry circuit of a counter.

The counter circuit for a representative denominational order of the accumulator is shown in Figs. 2A and 2B with Fig. 2A to the left of Fig. 2B. This counter circuit employs the bi-quinary number notation of add decimal numbers. It is to be understood that this notation is used for illustration only. In the bi-quinary notation, a decimal value is represented by the operation of two of seven elements, five quinary elements which may be numbered 0 to 4, each representing two decimal values depending upon which of two binary elements is operated, and the two binary elements. When the "00" binary element is operated, the five quinary elements have decimal values 0 to 4. When the "5" binary element is operated, the five quinary elements have decimal values 5 to 9. The quinary elements are represented by the adding tubes 200 to 204 and their mate tubes 200′ to 204′. These tubes are arranged in trigger circuits and operated as relays. The five pairs of quinary tubes are arranged in a closed ring, the "zero" tube being tube 200. The binary elements are represented by the tubes 205 and 205′ arranged in a trigger circuit. Tube 205′ represents "00" in the bi-quinary notation. Tube 205 represents "5" in the bi-quinary notation. Thus, for example, if tubes 200 and 205′ are turned on and are conducting at the same time, the decimal value of "0" is represented by "0–00" in the bi-quinary notation. If tube 205 is turned on in place of tube 205′, the decimal value of "5" is represented by "0–5" in the bi-quinary notation.

The circuit is arranged so that when tube 204, representing the quinary "4," is turned off and tube 200, representing the quinary "0," is turned on, a pulse from tube 204 triggers the binary tubes 205 and 205′. If tube 205′ is on at this time, it is turned off and tube 205 is turned on. Similarly, if tube 205 is on at this time, it is turned off and tube 205′ is turned on. Thus, a count of five changes the binary representation from "00" to "5" or from "5" to "00." Since a change from "0–5" to "0–00" represents a change from a decimal "9" to "0" with a carry of one, which occurs when tube 205 is turned off and 205′ is turned on, it is registered for carry purposes.

The relation of the tubes to the decimal notation then becomes:

| Decimal Value | Tubes turned on | | Bi-quinary Notation |
|---|---|---|---|
| | Quinary | Binary | |
| 0 | 200 | 205′ | 0–00 |
| 1 | 201 | 205′ | 1–00 |
| 2 | 202 | 205′ | 2–00 |
| 3 | 203 | 205′ | 3–00 |
| 4 | 204 | 205′ | 4–00 |
| 5 | 200 | 205 | 0–5 |
| 6 | 201 | 205 | 1–5 |
| 7 | 202 | 205 | 2–5 |
| 8 | 203 | 205 | 3–5 |
| 9 | 204 | 205 | 4–5 |

*Operation of quinary ring*

The pairs of quinary tubes are connected in a ring circuit and the network surrounding each pair of the tubes is the same for all. The cathodes of the adding tubes 200 to 204, inclusive, are connected to ground through a common resistance 206 and the cathodes of the mate tubes 200′ to 204′ are likewise connected through a common resistance 207 to ground to provide for the same cathode potential on all the tubes in the ring. Only one of the adding tubes 200 to 204 and four of the mate tubes 200′ to 204′ are on at the same time. Hence, the value of resistance 207 should be one-quarter the value of the resistance 206.

Each of the tubes 200–204 and 200′–204′ is provided with a potentiometer. For example, tube 201 is controlled by a potentiometer composed of resistances 208 and 209, the junction of which is connected in series with resistance 227 to grid 210 of tube 201. One end of this potentiometer from resistance 208 is connected to ground while the other end, leading from resistance 209 is connected to plate 211 of the mate tube 201′. When the potential of plate 211 is high, the potential on the grid 210 of tube 201 is high and tube 201 is held on. Plate 211 is connected to the high potential plate battery via conductor 212 and resistance 213.

Similarly, tube 201′ is controlled through potentiometer resistances 214 and 215, the junction of which is connected through resistance 227A to grid 216 of tube 201′. Resistance 214 is connected to ground and resistance 215 is connected to plate 217 of tube 201. The plate 217 is connected to the high potential plate battery via anode resistance 218 and conductor 219. The potentiometer resistances 209 and 215 are bridged by condensers 220 and 221 to facilitate the operation of the tubes.

It is evident that, when a positive pulse is applied to grid 210 of tube 201, the tube will be turned on and the potential at plate 217 is decreased. This reduces the potential on grid 216 of tube 201′ through the potentiometer resistance 215 and tube 201′ is turned off. When tube 201′ turns off, the potential at plate 211 increases and correspondingly increases the potential on grid 210 of tube 201 through potentiometer resistance 209. The pulse required to operate tube 201 need only be such as to start the process of turning off tube 201′. Once this process is started, the two tubes automatically adjust themselves so that tube 201 is held on by tube 201′ and tube 201′ is held off by tube 201.

The low resistances 227 and 227A in series with grids 210 and 216, respectively, may have values of approximately 50 ohms. They serve to prevent such parasitic high frequency oscillations that might otherwise arise due to the wiring of the networks and tubes and do not interfere with the trigger operation of the tubes as just described.

Figure 3:
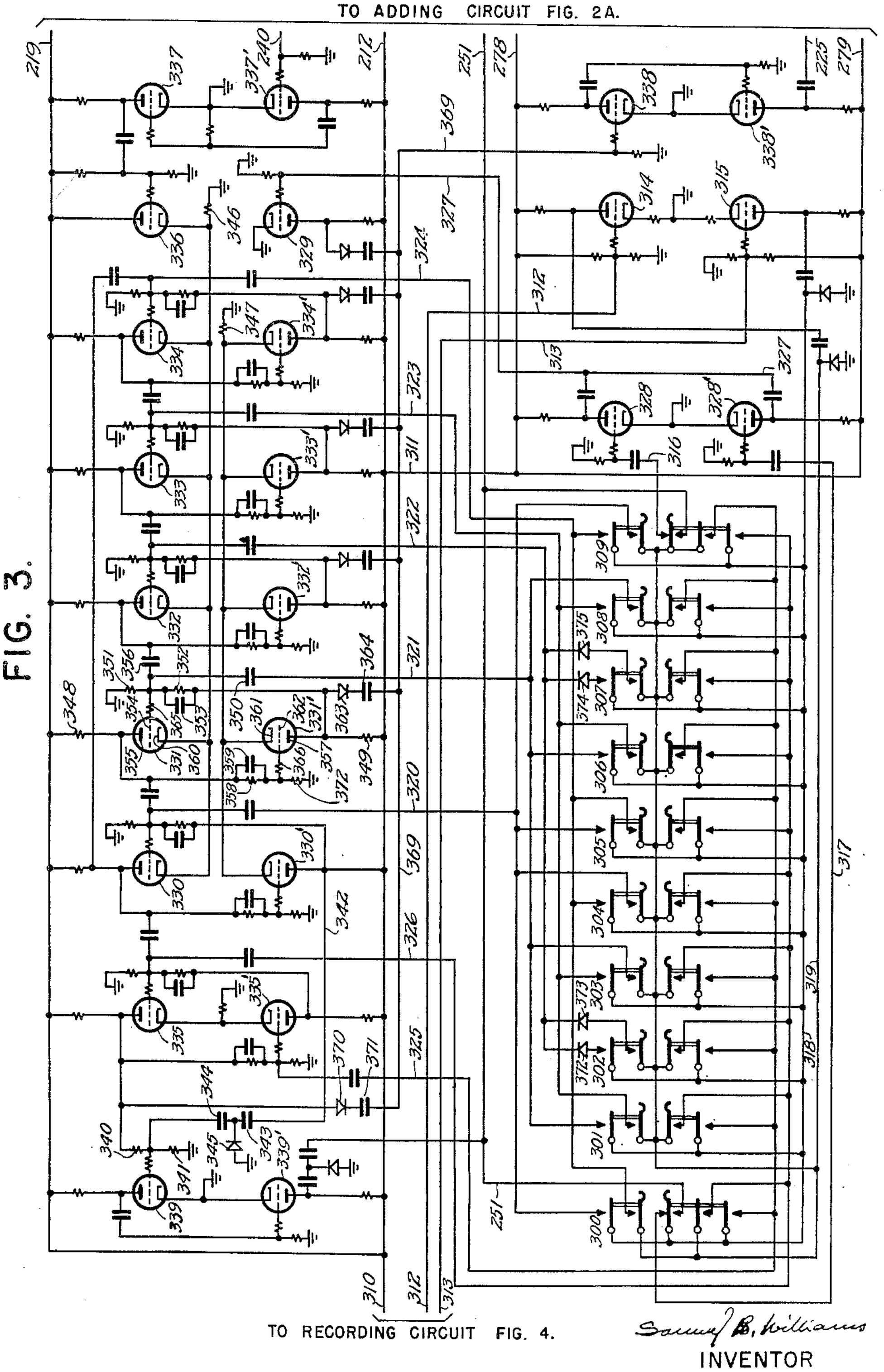
Fig. 3 shows the key set circuit.

The adding tubes of the quinary ring of Fig. 2A and the counting tubes of Fig. 3 are arranged to drive each other in a self-operating interrupter circuit. When an adding pulse operates a tube in the quinary ring of the adding circuit, Fig. 2A, a return or counting pulse is produced, which operates a counting tube in the quinary ring of the key set circuit, Fig. 3. This, in turn, returns an adding pulse to the quinary ring of the adding circuit. Thus, the two circuits drive each other until stopped by the start-stop trigger pair comprising tubes 228 and 228′ of the counter control circuit.

The quinary ring is controlled by driver tube 222 and its pulse amplifier tubes 223 and 223′. A pulse from the recording circuit, Fig. 4, via conductor 289 (Fig. 2A) turns on stop tube 228′ and start tube 228 is turned off. The increase in the potential of the plate of start tube 228 conditions driver tube 222 by raising the potential of grid 232 through the potentiometer resistances 230 and 231 to permit tube 222 to respond to pulses from amplifier tube 223 via condenser 233.

When a positive pulse is received from the key set circuit, Fig. 3, via conductor 225 and inner contacts of key 226, it is amplified and shaped by amplifier tubes 223′ and 223 to produce a suitably shaped positive pulse through condenser 233 to operate driver tube 222. The cathode 234 of driver tube 222 is connected to resistance 206 in common with the cathodes of the quinary ring tubes 200–204 and plate 235 is connected directly to high potential plate battery on conductor 219. When driver tube 222 is operated, an operated quinary adding tube, 200 to 204, is short circuited by driver tube 222 and turned off. For example, if adding tube 200 is on, a positive pulse via conductor 225 momentarily turns on driver tube 222 which short circuits and turns tube 200 off. When adding tube 200 turns off, tube 200 turns on its mate tube 200′ and also applies a positive pulse to adding tube 201 which is turned on. The reduced potential at plate 217 of tube 201 acting through potentiometer resistances 215 and 214, turns off mate tube 201′. When mate tube 201′ is turned off, the increase in potential at its plate 211 creates a positive pulse through rectifier 297, condenser 298 and conductor 271, which is amplified and shaped by tubes 238 and 238′ and passed to the key set counting tubes of Fig. 3 via an inner contact of key 273 and conductor 240.

Thus, the "return" pulse becomes the "counting" pulse to signal that the addition has been made in the counter, but it is not created until after the addition is completed by turning on the adding tube next in the ring and turning off its mate tube. The automatic or self-pulsing operation is rendered operative by start tube 228 via potentiometer resistances 230 and 231 connected to grid 232 of driver tube 222. This resistance combination is such that, when tube 228 is turned off due to the turning on of tube 228′ driver tube 222 is conditioned for operation. Similarly, when tube 228 is turned on, the potential at the grid 232 of driver tube 222 is reduced and the driver tube 222 does not respond to pulses. Each of the adding tubes 200 to 204 and their mate tubes 200′ to 204′ are provided with network circuits and resistances similar to those just described for tubes 201 and 201′ and with return pulse rectifiers and condensers, as shown at 297 and 298 respectively, for the mate tube 201′.

It will be noted that, when tube 204 is turned off, tube 200 is turned on by a pulse through condenser 245. The binary tubes 205 and 205′ are operated at this time. These tubes, 205 and 205′, are provided with a resistance network similar to the quinary adding tubes such as 201 and 201′. The grids of tubes 205 and 205′ are connected through condensers 236 and 237 and a series condenser 241 to plate 246 of tube 204. A rectifier 270 is employed to drain off any negative pulse created at the plate 246 of tube 204. Hence, each time the addition through the ring is completed and the adding passes from tube 204 to tube 200, a positive pulse is applied through condensers 241, 236 and 237 to the grids of tubes 205 and 205′. If, for example, tube 205′, representing "00," is on at this time, the positive pulse is effective to turn on tube 205, and tube 205′ is automatically turned off through the resistance network. Thus, on a count of five when tube 204 is turned off and tube 200 is turned on, tube 205 will be turned on and tube 205′ will be turned off. If the addition proceeds and tube 204 is turned off and tube 200 turned on at the time that tube 205 is on, a decimal count of ten would be represented and the pulse from plate 246 of tube 204 turns on tube 205′ and tube 205 is automatically turned off. Hence, a decimal count in the adding circuit which adds up to ten or more, will cause tube 205′ to turn on and tube 205 to turn off.

It is necessary to register the passing of the decimal count from nine to zero, on addition, in order to provide for an out-carry signal for a carry of one, because the binary tubes 205 and 205′ may again be operated when the addition requires an additional five counts. For example, if six is to be added to nine held in the counter, tubes 204 and 205 are on when the addition is started. The first of the six pulses turns on tubes 200 and 205′ and tubes 204 and 205 are turned off. When the sixth pulse is received, tube 204 is again turned off and tube 205 turned on. Thus, tube 205 is in the same condition as it was at the start of the addition. A pair of tubes, 258 and 258′, are provided to register the change from 205 to 205′ but not from 205′ to 205. Normally, tube 258 is on but when tube 205 is turned off, a positive pulse via condensers 255 and 256 is applied to the grid of tube 258′ to turn it on and tube 258 is automatically turned off. This registers the out-carry of one for the carry circuit of Fig. 2B to send to the next left hand counter when the carry circuit is operated as will now be described.

*Carry tubes*

Referring to Fig. 2B, two pairs of carry registration tubes are required. Tubes 247 and 247′ register the carry of zero and tubes 248 and 248′ register the carry of one. The incoming signal from the next right hand counter, Fig. 2B, or from the control circuit, Fig. 4, to the counter of the lowest denominational order is applied to conductor 249 or 250 depending upon whether the in-carry is zero or one. Normally tubes 247′ and 248′ are on. When an addition is completed by the adding tubes and a signal is received from the key set circuit of Fig. 3 via conductor 251, tube 228 of Fig. 2A is turned on and tube 228′ is turned off. A pulse from tube 228′ via conductor 252 turns on tubes 247 and 248 of Fig. 2B to register the completion of the addition. This circuit may be traced from the plate of tube 228′ via conductor 252, condensers and rectifiers, condensers and resistances to the grids of tubes 247 and 248. Tube 269 is conditioned by the increased potential on conductor 252 to respond to a return pulse from the adding tubes as will be described later.

When an in-carry signal for a carry of zero is received via conductor 249, tube 247′ is turned on and tube 247 is turned off to apply a positive pulse to conductor 274. If the in-carry signal for a carry of zero is received before the addition is completed, tube 247 is turned on and tube 247′ is turned off creating a negative pulse which is dissipated by rectifier 272. When the addition-completion signal is received from tube 228′ via conductor 252, tube 247′ is turned on and tube 247 is turned off to apply a positive pulse to conductor 274.

It is obvious that the positive pulse on conductor 274 is created only when the addition-completion signal and the in-carry signal are both registered and that it is immaterial whether the in-carry signal pulse arrives before the addition-completion signal pulse from tube 228′, or vice-versa, because both signals are required for the cycle, in which tube 247 is first turned on and then turned off.

When an in-carry signal for a carry of one arrives on conductor 250 before the addition is completed, tube 248 is turned on. The addition-completion signal turns off tube 248 to apply a positive pulse to conductor 254. However, if the addition is completed before the in-carry signal arrives, tube 248 is turned on to register the in-carry signal. Thus, the signal from the next right hand counter or from the adding tubes of the same counter may arrive first but the other signal must be received before the carry becomes effective.

An in-carry signal for a carry of one requires an addition of one to the adding tubes before the out-carry signal is created. If the in-carry signal is received before the addition-completion signal, the in-carry signal is registered by the operation of tube 248 and, when the addition is completed, the operation of tube 248′ by tube 228 turns off tube 248 to apply a positive pulse to conductor 254 to operate tube 222′ of Fig. 2A. Tube 222′ short circuits the quinary adding tubes 200 to 204 to advance the ring count by one. The return pulse via conductor 271 operates tube 269 of Fig. 2B which, as previously described, was conditioned by tube 228′ via conductor 252. Tube 269′ is turned off momentarily to send a positive pulse via condenser 275 to conductor 274.

As previously described, when the decimal count exceeds nine, binary tube 205 is turned off and tube 205′ is turned on. Tube 205 turns on tube 258′ to adjust the carry circuit of Fig. 2B to pass an out-carry of one to the next left accumulator. It will be noted that out-carry amplifier tubes 262′ and 265′ are conditioned by tubes 258 and 258′. When tube 258 is on, the relatively low potential from its plate via conductor 259 and resistance 261 prevents tube 262′ from responding to a positive pulse via conductor 274 and condenser 243. At this time tube 258′ is off and the relatively high potential from the plate of tube 258′ via conductor 260 and resistance 264 conditions tube 265′ to respond to the positive pulse via conductor 274 and condenser 244. As previously described, when an out-carry of one results from an addition by the adding tubes, tube 258 is turned off and tube 258′ is turned on and the relative potentials are reversed. Tube 262′ is conditioned to respond, while tube 265′ is prevented from responding to a positive pulse via conductor 274. Thus, the pair of tubes, 258 and 258′, which registers the carry of one resulting from an addition, conditions the proper outgoing amplifier tube 262′ or 265′ to respond to the carry pulse via conductor 274 from tube 247 for an in-carry of zero, or tube 269′ when the in-carry of one is added to the adding tubes and the return pulse operates tube 269.

Each out-carry amplifier comprises two tubes. Tubes 262′ and 262 the latter of which operates momentarily when tube 262′ responds to the carry pulse via conductor 274, transmits an out-carry signal pulse for a carry of one via conductor 263 to the next left hand counter. Tubes 265′ and 265 the latter of which operates momentarily when tube 265′ responds to the carry pulse via conductor 274, transmits an out-carry signal pulse for a carry of zero via conductor 266 to the next left hand counter.

The cathodes of tubes 262′ and 265′ are connected to ground via resistance 267. The potential at the plate of reset tube 295 of Fig. 2A is applied via conductor 299 and resistance 268 to these cathodes for reset control as will be described later.

The operation of the carry tubes under the four conditions of in-carry zero, out-carry zero; in-carry zero, out-carry one; in-carry one, out-carry zero; and in-carry one, out-carry one, will now be described.

*In-carry zero, out-carry zero*

Under this condition tube 258 is on. This conditions tube 265′ via conductor 260 so that a positive pulse via conductor 274, condenser 244, tubes 265′ and 265 which amplify and shape the pulse, is passed over conductor 266 to the next left hand counter. The pulse via conductor 274 is produced when tube 247′ is turned on and tube 247 is turned off as a result of an in-carry-of-zero pulse via conductor 249 and the turning off of tube 228′ when tube 228 is turned on by the addition-completion pulse via conductor 251.

*In-carry zero, out-carry one*

Under these conditions, tube 258′ is on and tube 258 is off due to the turning on of tube 205′ as previously described. Tube 262′ is now conditioned via conductor 259 to pass the pulse via conductor 274, condenser 243, tubes 262′ and 262 and conductor 263 to the next left hand counter. The pulse via conductor 274 is produced when tube 247 turns on and tube 247′ turns off, as previously described.

*In-carry one, out-carry zero*

On an in-carry of one it is necessary to add one to the quinary ring before passing a pulse to the out-carry conductor as previously described. To insure that the in-carry of one is added, the return pulse from the adding tubes causes the generation of the out-carry pulse. At this time tube 228 is on and tube 228′ is off. This conditions tube 269 to respond to the return pulse from the ring via conductor 271. When tube 248 is turned on and tube 248′ is turned off due to the reception of the final carry signal via either conductor 250 or 252, a pulse via conductor 254 turns on tube 222′. Tube 222′ is, at this time, conditioned in a similar manner to tube 222 but the conditioning is under control of tube 295′ for reasons to be described later. Tube 222′ causes an entry of a value of one to take place in the manner described for tube 222 and the return pulse via conductor 271 is passed via tubes 269 and 269′, condenser 275, conductor 274, condenser 244, tubes 265′ and 265 and conductor 266 to the next left hand counter.

*In-carry one, out-carry one*

If an out-carry of one is registered by the adding tubes when an in-carry of one is received, tube 258 is on and the in-carry pulse from tube 248 via conductor 254 adds one count to the ring. The return pulse is passed via conductor 271, tubes 269 and 269′, condenser 275, conductor 274, condenser 243, tubes 262 and 262′ and conductor 263 to the next left hand counter.

*Reset*

As will be explained in connection with Fig. 4, at the end of each addition certain tubes in the counter circuits of the accumulator are "reset" to prepare for the next addition. Referring to Fig. 2A, tubes 295 in all the counters are turned off by ground from the control circuit of Fig. 4 via conductor 287. Tube 295 turns on tube 295′ and generates a positive pulse to turn on tubes 228, 258, 248′ and 247′ via conductor 299. This is the normal condition of the carry circuit and the reset should occur when tube 228 is on and tube 228′ is off. One or the other of the in-carry pairs will have passed through half of its cycle. That is to say, they will have received one pulse from tube 228′ when it turned off at the completion of the addition, or from the in-carry from the next right hand counter. It is necessary, therefore, to prevent the effect of an in-carry for the particular pair that has not completed its cycle. For example, if tube 247 is on, when tube 247′ is turned on due to reset, tube 247, in turning off, creates a pulse via conductor 274. However, reset tube 295′ when it is on, decreases the potential at the cathodes of tubes 262′ and 265′ to such extent that a pulse via conductor 274 is ineffective. Also, tube 222′ must be rendered ineffective at this time. If tube 248 were on, then, when tube 248′ is turned on, a pulse is applied to conductor 254 which would operate tube 222′ if it were not rendered inoperative by the lowered grid potential due to the reduced potential of the plate of the operated tube 295′ via resistance 253 and conductor 254.

*Set zero*

If the accumulator is to be set to zero, tubes 200 and 205′ in all the counters should be turned on. Also, the tubes in the carry circuit should be reset to their normal condition. A ground applied from the "set zero" key 440 of the control circuit of Fig. 4, via conductor 288 turns off tube 296 in all the counters as shown in Fig. 2A. When the set zero key is operated, the potential at the grids of tubes 296 in all the counter circuits is reduced and the tubes are turned off. This creates a positive pulse at the plate of each tube 296 to turn on tubes 200 and 205′ in each adding circuit. Reset tube 295 is turned off by the operation of tube 296′ and tubes 248′, 247′, 228 and 258 are turned on to set the carry circuit to normal as previously described.

The sequence of operations of the set zero and reset operations begins with the turning off of tube 296. At the time the positive pulse from the plate of tube 296 turns on tubes 200 and 205′, reset tube 295 is turned off. Tube 295 generates a positive pulse to turn on tubes 247′, 248′, 228, 258, and 295′ and renders tubes 262′ and 265′ non-responsive to a pulse via conductor 274. Tube 295′ renders tube 222′ non-responsive to a pulse from tube 248 at the time tube 248′ is turned on to turn off tube 248. If necessary, the operation of tube 248′ may be delayed to insure the non-operation of tube 222′ before tube 248′ is operated by a suitable delay network (not shown).

*Testing*

Each adding and control circuit, Fig. 2A, is provided with three keys, 226, 277 and 273, a pair of tubes, 292 and 292′ and a glow lamp 293. When key 226 is operated with key 273 normal, each operation of key 277 produces a pulse which operates the driver tube 222 to operate the adding tubes. Each time the adding tubes operate, the return pulse via conductor 271, tubes 238 and 238′ is returned to the key set circuit via conductor 240 and the tester will know that the key set circuit functions because a new adding pulse via conductor 225, bottom make contact of key 226, top normal contact of key 273, conductor 294, triggers the pair of tubes 292 and 292′. If the glow lamp is lighted it will go out, or if it is not lighted it will light, thus indicating the proper operation of the key set circuit.

When key 273 is operated and a pulse is produced by the operation of key 277, the return pulse via conductor 271, tubes 238 and 238′ condenser 239, make contacts of key 273 and conductor 294 operates the trigger tubes 292 and 292′. In this way the tester will know from the glow lamp that the return pulse is being produced. Although not shown on the drawings, glow lamps may be connected to conductors 280 to 286, inclusive, by means of which the tester is able to observe the progress of the addition.

OPERATION OF KEY CIRCUIT

Fig. 3 shows the key circuit for entering the digital value of one denominational order into the calculator, and is representative of the various denominations of key circuits which might be used. The ten keys 300 to 309 may be any suitable type. For example, the ten keys may be arranged in a strip with suitable mechanical links between them to insure that when one key is operated another operated key will be released. There may also, if desired, be a magnetically operated latch so arranged that at the time of reset, the keys are released when an addition or subtraction is completed. Since the mechanical arrangement of the key is not a part of this invention, any of the desirable arrangements may be assumed. It is necessary, however, to operate the zero key on subtraction. For addition it is not essential that the zero key be operated but it would be desirable to operate the zero key in all cases and this assumption is made for the purpose of this description.

Each of the keys 300 to 309 has two sets of contacts, one for addition and one for subtraction. The operation of a key completes circuits from the pulse tubes 314 and 315 to select the counting tubes 330 to 335 to be operated thereby registering the digital value represented by the operated key. When the addition key 420 of Fig. 4 is operated, as will be described later, a ground pulse via conductor 313 turns off tube 315 which produces a pulse to turn on one of the tubes 330 to 334 and either 335 or 335′ depending upon the operated key. For example, if key 301 is operated, a circuit may be traced from the plate of tube 315 via conductor 318, upper contact of key 301, conductor 321 to the grid 354 of tube 331. Another circuit may be traced via the bottom contact of key 301, conductor 325 to the grid of tube 335′. When these two tubes are turned on, a decimal value of one in the bi-quinary notation is registered in the tubes. If the subtract key 422 of Fig. 4 is operated when key 301 is operated, a ground pulse via conductor 312 turns off tube 314 which produces a pulse on conductor 319, inner make contacts of key 301, conductor 323, to turn on tube 333, and via conductor 326 to turn on tube 335. This registers the nine's complement or a decimal eight in the bi-quinary notation. Since the two top contacts of keys 302 and 307 are connected to the same conductor 322, rectifiers 372 and 373 and rectifiers 374 and 375 are connected in opposing relation to prevent a positive pulse on conductor 319 or 317 from crossing over to conductor 317 or 319 and falsely operating tube 335 or 335′ when key 302 or 307 is operated.

The counting tubes are arranged to count down, numerically, from tube 334 to tube 330. It will be noted that these tubes, as well as the binary tubes 335 and 335′ are arranged in a trigger circuit similar to the adding tubes of the counter Fig. 2A. For example, grid 354 of tube 331 is connected to the junction of two resistances 351 and 352, resistance 351 being connected to ground and resistance 352 to plate 357 of mate tube 331′. Similarly, grid 362 of tube 331′ is connected to the junction of two resistances 358 and 372, resistance 372 being connected to ground and resistance 358 to plate 355 of tube 331. Condensers 353 and 359 are bridged around resistances 352 and 358, respectively, to facilitate the operation of the tubes. When tube 331 is turned on, the potential at plate 355 is reduced which reduces the potential on grid 362 of mate tube 331′ and tube 331′ is turned off. The high potential then on plate 357 of tube 331′ raises the potential at grid 354 of tube 331 to hold tube 331 on. Low resistances 365 and 366 are connected in series with grids 354 and 362 to suppress parasitic high frequency oscillations that may arise due to wiring. Thus, the two tubes are stabilized, tube 331 being on and tube 331′ being off.

When tube 331′ is turned off, an adding pulse is sent via rectifier 363, condenser 364, conductor 369, tubes 338 and 338′ and conductor 225 to operate driver tube 222 of Fig. 2A to advance the adding ring one count, as previously described. When the counting pulse, as previously described, is returned via conductor 240, it is amplified by tubes 337′ and 337 of Fig. 3 to operate driver tube 336. This reduces the value held on the counting tubes by one. For example, if tube 331 is on, this return or counting pulse will turn off tube 331 and turn on tube 330.

It will be noted that there is no adding pulse rectifier and condenser for the mate tube 330′ of tube 330. If tube 335′ is on at this time, tube 339 is conditioned to respond to the pulse from tube 330′ via conductor 342, condensers 343 and 344. Tube 339 operates and turns off tube 339′ which generates a pulse to turn on tube 228 via conductor 251 of the counter circuit Fig. 2A, to stop the addition in the adding circuit, as previously described.

If tube 335 is on when tube 330 is turned on, the negative pulse from tube 330 turns off tube 335 which applies a pulse via rectifier 370 and condenser 371 to conductor 369. This is an adding pulse to replace the pulse that would be created by tube 330′ and thus continues the addition. It will be noted that, when tube 335 turns off, tube 339 is rendered responsive to a pulse from tube 330′. When tubes 330 to 334 again count down to tube 330 in the second cycle of the count, the pulse from tube 330′ is amplified by tubes 339 and 339′ and passed via conductor 251 as the addition-completion pulse to stop the addition.

Figure 4:
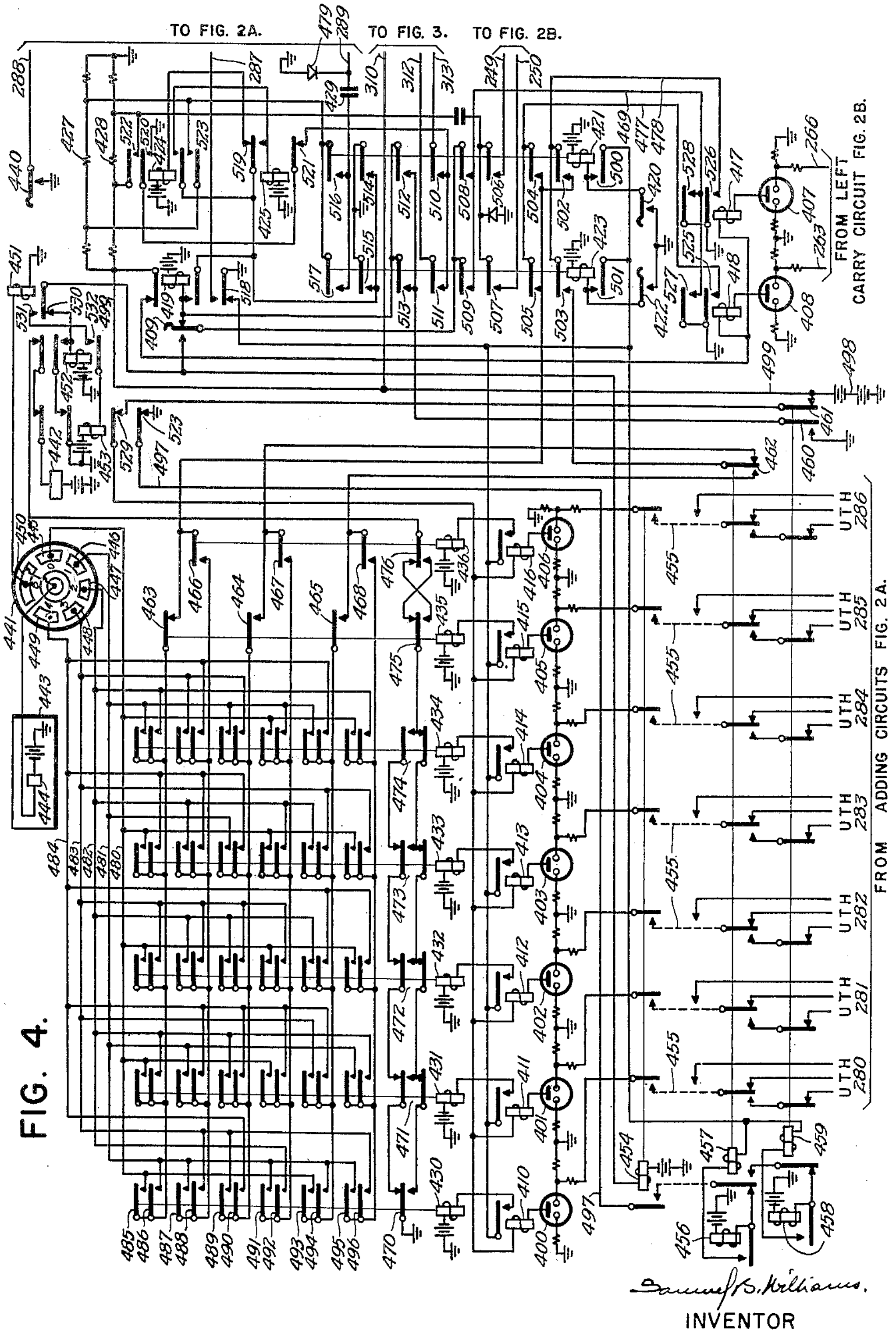
Fig. 4 shows the common control circuit which includes the printing circuit and printer.

When the starting pulse is received via conductor 312 from the common starting circuit of Fig. 4, the ground operates tube 314 which produces a pulse via conductor 319, normally closed bottom inner contact of key 309, conductor 316, to turn on tube 328. This produces a negative pulse via conductor 327 to turn off tube 329 which produces a positive pulse via conductor 369, tubes 338 and 338′ and conductor 225 to operate the driver tube 222 of the adding circuit, Fig. 2A, for the first addition. Thereafter, following the counting pulse, the counting tubes 334 to 330 are operated as described.

If the operation is one of addition, the start pulse is received via conductor 313 from the common starting circuit, Fig. 4, to operate tube 315 which produces a pulse via conductor 318, the bottom inner contact of key 300 to conductor 317 to turn on tube 328′. The resulting negative pulse via conductor 327 turns off tube 329 to produce the starting pulse.

When a digital value of zero (0) for addition, or nine (9) for subtraction, is to be entered, no adding pulse should be sent to the adding tubes but stop tube 228 of Fig. 2A must be turned on to signal the addition-completion. The starting pulse for the addition is prevented by opening the circuit from conductors 318 or 319 to tubes 328 or 328′ through a normally closed contact of key 300 for addition, or 309 for subtraction. For addition when the zero key 300 is operated, the starting pulse via conductor 313 and tube 315 is connected to conductor 251 at the bottom inner make contact of key 300 and tube 228 of the accumulator, Fig. 2A, is turned on. Tube 329 is not operated to start the addition, as previously described. For subtraction when key 309 is operated to represent the nine's complement of nine (9), the starting pulse via conductor 312 and tube 314 becomes the addition-completion pulse via conductor 251 and tube 329 is not operated to start an addition.

OPERATION OF RECORDING CIRCUIT

The recording circuit of Fig. 4 provides for the operation of the printer 443 under control of the distributor 441 and shows the control keys common to the counter and key circuits. The zero set key 440 connects ground to conductor 288 to turn off the zero set tubes 296 of all the counters shown as Fig. 2A, as previously described.

A key 409 is provided which, when operated, provides for printing the number held in the accumulator. When key 409 is normal, printing will not occur but the carry tubes of all the counters in the accumulator will be reset to normal and the calculator is conditioned to receive another number.

Two keys, 420 and 422, are provided for starting the operation of the calculator for addition or subtraction, respectively. Key 420 closes the operating circuit for relay 421, and key 422 similarly closes the operating circuit for relay 423. These relays lock via their own contact 500 or 501 and a back contact 518 of release relay 419. The operation of relay 421 or 423 closes a circuit from ground, contact 514 of relay 421 or contact 515 of 423, back contact 519 of relay 425 to operate relay 424. Ground, front contact 520 of relay 424, back contact 521 of relay 425 and front contact 510 of relay 421 is connected to conductor 313, or front contact 511 of relay 423 to conductor 312. This, as previously described, is the starting pulse which operates the counting tubes of the key set circuit, Fig. 3, in accordance with an operated key. The operation of relay 424 operates relay 425 and opens this ground. It will be noted that, when relay 424 is operated, contacts 523 and 522 short circuit the middle resistances 427 and 428 of the series resistances connecting high tension battery 498 via conductor 499 to ground. This sends a pulse via conductor 289 to turn on tubes 228′ and to turn off tubes 228 in all the counters. This conditions the counters for pulsing because the increased potential at plates of tubes 228 conditions the driver tubes 222 for operation, as previously described. Another pulse is sent via contacts 506 or 507 of relay 421 or 423 and conductor 249 or 250 to the counter of the lowest denominational order in the accumulator to start the operation of the carry circuits of Fig. 2B.

Tubes 400 to 408, inclusive, are cold cathode tubes and, when turned on, operate relays 410 to 418, respectively. When the additions in all the counters are completed, a carry pulse from the counter of the highest denominational order in the accumulator via conductor 266 or 263 turns on tube 407 or 408 to operate relay 417 or 418 via the plate of tube 407 or 408 and back contact 524 of relay 419 from high tension battery 498. Ground is now connected via conductor 469, contact 408 or 509 of relay 421 or 423, normally closed contact of key 409 to operate relay 419. The operation of the release relay 419 connects ground to conductor 287 which, as previously described, operates the reset tubes 295 in all the counters. Relay 419 locks to ground via its own contact and a contact 514 or 515 of relay 421 or 423. The back contact 518 of relay 419 opens ground to release relay 421 or 423 which, in turn, releases relays 419 and 425.

If it is desired to print a result, key 409 is operated before either key 420 or 422 for the final calculation. When relay 421 or 423 is operated, ground from contact 525 or 526 of relay 417 or 418, via conductor 469, contact 508 or 509 of relay 421 or 423, make contact of key 409, operates relay 454. Relay 454 connects tubes 400 to 406 to conductors 280 to 286 from the accumulator. There is indicated by designation "455" those progress relays of higher orders than the ten's order. When relay 454, for example, is operated, referring to Fig. 1, the ten thousand's digit would be printed first, because it would be contained in the extreme left hand or highest denominational order counter. One of the tubes 400 to 404 and either tube 405 or 406 are turned on. The relays 410 to 416 are operated when the corresponding tubes 400 to 406 are turned on. For example, assume tube 400 is turned on. Relay 410 is in the anode circuit of tube 400, which circuit extends to high tension battery 498 through back contact 529 of relay 453 and back contact 461 of relay 459. Ground from a back contact of relay 419 and the front contact of relay 410 operates relay 430.

It is to be noted that relays 430 to 436 are operated via contacts on relays 410 to 416, respectively. It will be assumed that relays 410 and 415 are operated and consequently relays 430 and 435 both operate. This represents a decimal "0" from the accumulator, or "0–00" in the bi-quinary notation and "0" is to be printed. When relays 430 and 435 operate, a circuit is closed from ground through contacts 470 to 476 to complete a circuit only when exactly one of the relays 430 to 434 is operated and when either relay 435 or 436 is operated. This ground through back contacts of relays 452 and 453 operates magnet 442 of the distributor 441.

The distributor 441 and the printer 443 represent an electrically operated printing mechanism such as an electrically operated typewriter. For the purpose of illustration, 443 represents the well known Teletype printer and 441 represents the well known Teletype distributor, which, operating in synchronism with the printer, converts the simultaneous signals from the relays to a time division basis for operating the printer. Normally, the printer magnet 444 is connected through the distributor segment 450 to ground via the winding of relay 451 and relay 451 is held operated. As the distributor brush rotates, this circuit is opened and relay 451 releases. The brush then closes contacts 445 to 449, in succession, to the printer magnet 444 so that ground appearing on any one of these segments will operate the code bars in the printer at the proper time to set up the desired number combination.

When relay 451 releases, ground, as previously described, from contact 526 of relay 417, via conductor 469, front contact 508 of relay 421 operated contact of key 409 and back contact 530 of relay 451, operates relay 452 which locks to a back contact of relay 453. Relay 451 cannot be operated until the distributor again closes contact with segment 450 at the completion of the printing operation. When this occurs and relay 451 operates, circuit is closed for operating relay 453 from ground, contact 528 of relay 417, conductor 469, front contact 508 of relay 421, operated contact of key 409, contact 531 of relays 451 contact 532 of relay 452, winding of relay 453 to battery. The operation of relay 453 opens the locking circuit of relay 452, removes high tension battery 498 from relays 410 to 416, inclusive, and ground from conductor 497. As will be described, the opening of ground from conductor 497 advances the progress relays, designated generally by 455, to the next right hand counter and, as described, the digit held in that counter is printed.

When the ground via conductor 497 extends to the ten's progress relays, relay 456 operates and extends the ground to the winding of relay 457 which does not operate because of the short circuit on its winding from ground at back contact 518 of relay 419. The ten's digit is printed and, when relay 453 operates and removes ground from conductor 497, the short circuit is removed from relay 457 which operates in series with the winding of relay 456 to battery and extends conductor 497 through a back contact of relay 459 to relay 458. When relay 453 releases, relay 458 operates, but relay 459 is short circuited. The units digit is now printed and, at the end, relay 459 operates. Relay 459 operates contacts 460 and 461. Contact 460 closes ground via contact 512 of relay 421 to operate relay 419 which restores the calculator to normal but does not set zeros. Contact 461 disconnects high tension battery 498 from relays 410 to 416 and restores the recording circuit to normal.

As previously described, the printer is operated by connecting ground to various segments of the distributor 441. For example, if relays 430 and 435 are operated and the process is one of addition, ground via contact 526 of relay 417, conductor 478, contact 502 of relay 421, contact 463 of relay 435 and contacts 485 and 486 of relay 430, conductors 480 and 481, is connected to segments 445 and 446 of the distributor. As the distributor arm is rotated, printer magnet 444 is operated at the proper time and the printer is thus caused to print "0." If relay 436 is operated instead of relay 435, this ground via contact 466, contacts 487 and 488 is extended to segments 446 and 448 of the distributor and "5" would be printed.

In subtraction when the difference is a positive quantity, tube 408 is turned on and relay 418 is operated. Ground via contact 525 of relay 418, conductor 477, contact 505 of relay 423 is extended to contact 463 or 466 of relay 415 or 416 and the number is printed as it appears in the accumulator as just described for addition.

In subtraction, when the difference is a negative quantity, relay 417 is operated and ground from contact 526 of relay 417, conductor 478, contact 503 of relay 423 is extended to contact 462 of the ten's progress relay 457. When this relay is normal, which it will be during the printing operation of all the digits in the accumulator except the unit's digit, this ground is extended through contact 464 or 467 to contacts of relay 430, and the nine's complement of the number will be printed. For example, if contact 464 of relay 435 is closed, the ground is extended via contacts 489 and 490 and conductors 483 and 484 to segments 448 and 449 of the distributor 441. This will cause the printer to print "9" instead of "0." On the other hand, if contact 467 of relay 436 is operated, the circuit may be traced to distributor contacts 446 and 447 which will print "4" which is the nine's complement of "5." In printing the unit's digit from the right hand counter, the ten's complement having been printed, relay 457 operates contacts 462 to transfer the ground from contacts 467 and 464 to contacts 468 and 465 which together with contacts 493 to 496 of relay 430, for example, provide for unit's printing. If contact 465 is closed, the ground is extended to segments 445 and 440 of the distributor to print a "0" which is the ten's complement of "0." On the other hand, if contact 468 is closed, the ground is extended to segments 446 and 448 and a "5" is printed which is the ten's complement of "5." To facilitate the reading of this translation, the following table will be found useful:

| Decimal—Digit | Bi-Quinary—Digits | Relays—Operated | | Distributor Segments Grounded | | | | | |
|---|---|---|---|---|---|---|---|---|---|
| | | | | Direct | | 9's Comp. | | 10's Comp. | |
| 0 | 0–00 | 430 | 435 | 445 | 446 | 448 | 449 | 445 | 446 |
| 1 | 1–00 | 431 | 435 | 445 | 447 | 447 | 449 | 448 | 449 |
| 2 | 2–00 | 432 | 435 | 445 | 448 | 447 | 448 | 447 | 449 |
| 3 | 3–00 | 433 | 435 | 445 | 449 | 446 | 449 | 447 | 448 |
| 4 | 4–00 | 434 | 435 | 446 | 447 | 446 | 448 | 446 | 449 |
| 5 | 0–5 | 430 | 436 | 446 | 448 | 446 | 447 | 446 | 448 |
| 6 | 1–5 | 431 | 436 | 446 | 449 | 445 | 449 | 446 | 447 |
| 7 | 2–5 | 432 | 436 | 447 | 448 | 445 | 448 | 445 | 449 |
| 8 | 3–5 | 433 | 436 | 447 | 449 | 445 | 447 | 445 | 448 |
| 9 | 4–5 | 434 | 436 | 448 | 449 | 445 | 446 | 445 | 447 |

DETAILED OPERATION OF SYSTEM

For the purpose of illustrating the operation of the circuits when arranged in a calculator, it will be assumed that a five digit calculator will be composed of one circuit per Fig. 4 and five circuits each per Figs. 2A, 2B and 3, these circuits being arranged as shown in Fig. 5.

*Addition*

It will be assumed that "6823" is to be added to "9765" to obtain the sum of "16588." When the set zero key 440 is operated, ground via conductor 288 turns on tubes 296 in all the counters. Referring to Fig. 2A, a pulse is sent to tubes 200 and 205' which are turned on to place the decimal "0" in each counter and tube 296' is operated to operate tube 295 which resets the carry circuit thus insuring that tubes 228, 248', 247' and 258 are turned on. At the same time the potential on the grids of tubes 222', 262' and 265' are conditioned to prevent pulses from being falsely placed on outgoing carry conductors 263 and 266.

The number "09765" is set up on the key sets and the add key 420 is operated. As previously described with reference to Fig. 4, the operation of relay 424 connects a momentary ground to conductor 313.

Referring to Fig. 3, the starting pulse via conductor 313, operates tube 315 which transmits a pulse via conductor 318 to turn on the counting tubes associated with each denominational place in the accumulator and the number "09765" is now represented on the counting tubes. When the potential is raised on conductor 289, tube 228' is turned on and tube 228 is turned off. This raises the biasing potential on the grid of driver tube 222 through the potentiometer resistance 230, conditioning that tube for pulsing. The timing of the application of ground to conductor 313 and the increasing of the potential on conductor 289 may be controlled by the contacts of relay 424 and is such that, when the start counting tubes 328' and 329 of the key set circuits are operated, an adding pulse is sent via conductor 369, amplifier tubes 338 and 338', conductor 225, key 226, amplifier tubes 223' and 223 of Fig. 2A, to operate driver tube 222. When this tube is turned on, adding tube 200 is short circuited and turned off, sending a pulse to the next tube 201. When tube 201' turns off, a counting pulse via conductor 271, tubes 238 and 238', condenser 239, contact of key 273, condenser 272, conductor 240, tubes 337' and 337 of Fig. 3, operates driver tube 336 of the key set counting tubes. Driver tube 336 short circuits the counting tube that is on at that time and turns it off. The next counting tube is turned on and its mate tube is turned off, thus creating an adding pulse via conductor 369 for the next addition.

This operation continues until tube 330 is turned on and tube 330' is turned off. If tube 335' is on at this time, tube 339 is conditioned by the high potential from the plate of tube 335 and a pulse is generated by tubes 339 and 339' which passes via conductor 251 to turn on tube 228 of Fig. 2A, causing tube 228' to turn off. When tube 228 is turned on, the potential at the grid of driver tube 222 is so reduced that no further pulses can be added and, in fact, an adding pulse is not, at that time, received from the counting tubes. This operation of addition takes place in all the counters and their associated key set circuits at the same time.

The operation of the relays 421 and 424 of Fig. 4 has momentarily increased the potential on conductor 249, leading to the units counter. Since this high potential was connected to that counter when the relay 421 was operated, tube 247 is now turned on and tube 247' turned off, thus indicating an incoming carry of zero. As soon as the "5" is added in the right hand or units counter of the accumulator and tube 228 is turned on, tube 228' sends a pulse to the incoming carry tube pairs 247 and 248, see Fig. 2B. Tube 247' is turned off because 247 was turned on by the incoming carry pulse. The pulse created by tube 247 via conductor 274 will, in this case, pass through tubes 265' and 265 because the carry indicating tubes 258 and 258' have not been changed due to the addition of "5" to "0" in this counter. Hence, a pulse is sent via conductor 266 indicating that a carry is not to be added but that the addition was completed in the right hand counter. This is the in-carry-of-zero signal which indicates addition-completion in the right hand counter.

Assuming that the counters operate at practically the same speed, this signal will arrive in the next left or ten's counter, which is adding "6," just before the addition is completed in the ten's counter and similar operations will take place in that counter, resulting in a carry pulse via conductor 266 leading the next right hand or hundred's counter. In fact, since "09765" is being added to "00000," there will be an in-carry-of-zero at all of the counters. When the addition is complete in all of the counters, an out-carry-of-zero pulse from the extreme left hand or highest order counter of the accumulator via conductor 266 turns on cold cathode tube 407 of Fig. 4, resulting in the operation of relay 417. Ground from contact 528 of relay 417, conductor 469, contact 508 of relay 421, normal contact of key 409, operates relay 419. Relay 419 is the release relay. It connects ground to conductor 287 leading to all of the counters, to turn on the reset tubes 295 which, in turn, resets the carry tubes. Relay 419 locks to relay 421 which it releases, thus insuring the release of both relays. If the keys are of the magnetic type, they will be restored to normal at this time.

If the sum resulting from the next addition is to be printed, key 409 is operated first and the digit keys are then operated to represent the number "06823." The addition key 420 is now operated and the number "06823" is added to the number "09765" held in the accumulator in the same manner as just described for entering the first number "09765."

In this case some carries of one are involved. The addition of "3" to "5" and "2" to "6" do not involve a carry of one and the carry circuits operate in the manner just described. In the hundred's counter "8" is added to "7." Adding tubes 202 and 205 of Fig. 2A are on at the beginning of the addition. The first three of the eight pulses to be received from the counting tubes of the key set circuit operate tubes 203, 204 and 200. When tube 204 turns off to operate tube 200, a pulse is sent through condensers 241 and 237 to turn on tube 205' and turn off tube 205. The next four pulses advance the count to tube 204 and the final or eighth pulse again turns off tube 204 and turns on tube 200. Another pulse is sent through condensers 241 and 236 which turns on tube 205 and turns off tube 205'.

The third pulse of the eight added pulses brings the hundred's counter to a count of ten. When tube 205 turns off, on the third count, a pulse via condensers 255 and 256 turns on tube 258′ and turns off tube 258. Tube 258 conditions tube 262′ via conductor 259 and resistance 261 to respond to the carry pulse when tube 247 is turned off at the completion of the addition when tube 228′ is turned off. A pulse is then sent via conductor 274, condenser 243, tubes 262′ and 262 to conductor 263 to signal an out-carry of one. This is received on the next left or thousand's counter via conductor 250 and turns on tube 248′, if the addition in that counter is progressing.

In the thousand's counter "6" is to be added to "9" in addition to an in-carry of one. In this counter, tubes 204 and 205 are on at the beginning of the addition and at the completion of the addition of six pulses, tubes 200 and 205 are on. The first pulse turns on tubes 200 and 205′. When tube 205 turns off, a pulse via condensers 255 and 256 turns on tube 258′ and turns off tube 258 to condition tube 262′ to provide for a carry of one.

At the completion of the thousand's addition, tube 248 is turned on when tube 228′ is turned off. Tube 248 sends a counting pulse via conductor 254 to tube 222′ which operates in the same manner as tube 222, to turn off tube 200 and turn on tube 201. When tube 201′ is turned off, a carry pulse is generated by the return pulse via rectifier 297, condenser 298, conductor 271, tubes 269 and 269′, condenser 275, conductor 274, condenser 243, tubes 262′ and 262 to conductor 263, to signal an out-carry of one. It will be noted that, although conductor 271 would send a counting pulse through tubes 238 and 238′, tube 238 is, at this time, conditioned so that no pulse can be passed through it, whereas tube 269 is conditioned to pass a pulse. This is because tube 228 has been turned on and tube 228′ has been turned off.

Thus, a count has been added to the counter which was not received from the key set circuit but from the in-carry, but the outgoing carry was not made effective until after the pulse was added. The left hand counter is still registering zero and, since zero is entered from the keys, tubes 247′ and 248′ have been turned on. When the in-carry-of-one pulse is received in the left hand counter via conductor 250, tube 248 is turned on and one is added to the left hand counter, the sum in the accumulator now being "16588." The outgoing carry pulse appears on conductor 266 which turns on cold cathode tube 407 and operates relay 417. Since key 409 is operated, ground on conductor 469 is now effective to operate relays 454 and 451. Relay 454 closes the progress circuit for connecting the adding tubes of the various counters to the cold cathode tubes 400 to 406.

As previously described, as each digit is received from the accumulator, it is translated to the teletypewriter code and printed beginning at the left hand counter so that relays 411 and 415 are operated via conductors 281 and 285 from the left hand counter through contacts, shown generally as 455, and contacts of relays 457 and 459 of the progress relays. The distributor magnet 442 is operated and the distributor connects the translation relays from ground via conductor 478, a contact of relay 421, contact of relay 435, contacts of relay 431, through the distributor contacts, to operate printer magnet 444. The "1" is printed and when the start segment 450 is closed, relay 451 operates to operate relay 453 which advances the progress circuit to the next right hand counter. At this time "6" is printed and the process continues until finally the units "8" is printed and the number "16588" appears on the printer. When the units progress relay 459 is operated, ground at contact 460 via contact 512 of relay 421 operates relase relay 419 and the calculator is restored to normal, as previously described.

*Subtraction*

As previously stated, subtraction is obtained by adding the ten's complement of the subtrahend to the minuend held in the accumulator. The ten's complement is obtained by introducing the nine's complements of the numerical digits of the subtrahend by the use of the digit keys and introducing a carry of one into the right hand counter when the subtraction key is operated. Contacts on the digit keys provide for the nine's complement, thus enabling the operator to write up the digital values of the subtrahend directly.

The operation of subtraction therefore becomes substantially the same as for addition except that the key set circuit enters the nine's complement of the digit keys operated. It will be assumed that "6823" is to be subtracted from "9765," the difference being "2942." The calculator is set to zero, as described for addition. The minuend "09765" is entered as an addition into the accumulator. The subtrahend "06823" is then entered with keys 409 and 422 operated and relay 423 operates in an obvious circuit. Contacts of relay 423 start the operation of addition, as previously described, the number added being "93176" with a carry of one, or "93177" which is the ten's complement of the subtrahend "06823." This addition, it will be noted, results in the same difference as is obtained by ordinary subtraction and "02942" appears in the accumulator with a carry of one out of the left hand counter.

Upon the completion of the addition, the left hand counter sends a pulse via conductor 263 to turn on tube 408 and operate relay 418. Ground via contact 525 of relay 418, conductor 477 and contact 505 of relay 423, causes the number "02942," which is in the accumulator, to be printed.

When the subtrahend is larger than the minuend, the difference is a minus quantity. Thus, if "9765" is subtracted from "6823" the difference is "−2942." After the accumulator has been set to zero, the minuend "06823" is entered as an addition. The subtrahend is entered on the keys as "09765" and appears on the key set counting tubes as "90234." When the subtract relay 423 is operated, a carry of one is entered into the right hand counter to provide for the ten's complement, or "90235," which is added and a carry of zero is obtained from the left hand accumulator. Tube 407 is turned on and relay 417 operates.

It will be noted that, when subtract relay 423 is operated and a carry of zero is indicated by the operation of relay 417, the translating relays 430 to 436 cause the printing of the nine's complements of the digital values held in all the counters except the right hand counter, the ten's complement of which is printed, as previously described. Ground via contact 526 of relay 417, conductor 478, contact 503 of relay 423, back contact 462 of progress relay 457 provides for printing the nine's complements of the digital values in the accumulator. When relay 457 operates at the conclusion of the printing of the next to the last digit, contact 462 extends this ground to contacts of relays 430 to 436 to print the ten's complement of the last digit in the right hand counter. Thus, the number in the accumulator resulting from adding "90235" to "06823," or "97058" is printed as "02942."

No provision is shown in the circuits for printing a negative or minus sign as this is not an object of the invention, but it is obvious that the translating circuit of Fig. 4 could readily be arranged to print a minus (—) sign when relays 423 and 417 are both operated.

While I have described above the principles of my invention in connection with a specific embodiment, it is to be clearly understood that this description is made only by way of example and not as a limitation to the scope of my invention.

What is claimed is:

1. In a carry device for an accumulator comprising a plurality of counters, one for each denominational order, and a control circuit for each counter to indicate when addition has been completed in that order, the combination of a "carry-of-one" conductor and a "carry-of-zero" conductor connecting adjacent orders; a first means controlled by the counter of one denominational order for registering a requirement of a "carry-of-one" to the next higher order when the addition in said one order exceeds a predetermined amount or for registering a requirement of a "carry-of-zero" to the next higher order when the addition in said one order does not exceed said predetermined amount; a second means coupled to the "carry-of-one" conductor and the "carry-of-zero" conductor from the next lower order and to the control circuit for said one order and operable upon receipt of a signal over one of the conductors from the lower order and a signal from the control means; and a third means controlled by the first means and operated by the second means for sending a signal over the appropriate one of the conductors to the higher order according to the "carry-of-one" or "carry-of-zero" requirement registered by the first means.

2. A device as claimed in claim 1 in which the second means includes transfer entry means which are operable when the second means receives a signal over the "carry-of-one" conductor for causing a unit entry in the counter and thereafter causing an operation of the third means.

3. A device as claimed in claim 1 in which the first means normally registers a requirement of a "carry-of-zero," and in which means are provided to reset the first means to its "carry-of-zero" representation after every addition, to restore the first means to normal condition if it had been operated therefrom during the previous adding operation.

4. A device as claimed in claim 1 in which means are provided to supply a signal to the "carry-of-zero" conductor leading into the second means of the lowest order in adding operations.

5. A device as claimed in claim 1 in which means are provided to supply a signal to the "carry-of-one" conductor leading into the second means of the lowest order in subtracting operations.

6. A device as claimed in claim 1 in which the first and second means include trigger pairs of electron tubes which may operate from normal condition during an operation of the accumulator and in which reset means are provided to return any operated trigger pairs to normal condition at the end of an operation of the accumulator.

7. A device as claimed in claim 6 in which the reset means is operated by a signal sent from the highest denomination order over the "carry-of-one" or the "carry-of-zero" conductor at the completion of an operation of the carry device therein.

8. In a carry device for an accumulator of the type comprising a plurality of electronic counters, each representing a denominational order and capable of adding amounts, the combination of a "carry-of-one" conductor and a "carry-of-zero" conductor connecting adjacent orders; a first means for each order controlled by its related counter and operative upon completion of an addition for registering a "carry-of-one" requirement when the sum resulting from an addition in that counter exceeds a predetermined amount or for registering a "carry-of-zero" requirement when the sum in that counter does not exceed said predetermined amount; a second means for each order operative independently of the first means for registering the receipt of a signal that addition in said counter has been completed and for registering the receipt of a "carry-of-one" signal or a "carry-of-zero" signal over one of the conductors from the next lower order; and further means for each order responsive to the combined operation of the first and second means of its related order for transmitting to the next higher order a "carry-of-one" or a "carry-of-zero" signal over the proper one of said two conductors as required by the operation of the first means.

9. The device according to claim 8, in which said means for transmitting the carry signal to the next higher order includes two amplifier tubes, one being rendered responsive to a carry signal representing a carry of one, the other being rendered responsive to a carry signal representing a carry of zero, and in which the first means includes a pair of trigger tubes adapted to be operated by the adding tubes to render said amplifier tubes responsive in accordance with the carry requirement resulting from the operation of the adding tubes.

10. The calculator according to claim 8, in which the digital values are added by operating pairs of trigger tubes arranged in a ring, the operation of each pair of trigger tubes representing an addition of one to the amount held in the ring, and in which the first means registers the passing of the count beyond a predetermined amount.

11. The device according to claim 8, in which said second means includes two pairs of trigger tubes, one of said pairs being responsive to a carry signal representing a "carry-of-one" and the other one of said pairs being responsive to a carry signal representing a "carry-of-zero."

12. In an electronic calculator, an accumulator comprising a plurality of counter and key set circuits, one for each denominational place of a number, means for setting the key set circuit in accordance with an operated key to represent a numerical value, means in each counter circuit for adding the numerical value represented by an operated key independently of the other counters, means for providing a signal when addition is completed in an order, two conductors for transmitting carry signals from a counter of a lower order to the counter of the next higher order, one of said conductors transmitting a "carry-of-one" signal if a carry is required and the other of said conductors transmitting a "carry-of-zero" signal if no carry is required, a carry circuit associated with each counter for registering the carry signal received from the counter of the next lower order and for registering the receipt of the addition completion signal, and means operative in each said counter independently of the other said counters for transmitting a "carry-of-one" or "carry-of-zero" signal to said counter of the next higher order only when said carry circuit has registered both the signal of a "carry-of-one" or a "carry-of-zero" from said counter of the next lower order and said signal that the counter has completed said addition.

13. In a carry device for an accumulator comprising a plurality of counters, one for each denominational order, each counter capable of performing addition of amounts entered therein from a differential mechanism, the combination of a "carry-of-one" conductor connecting adjacent orders and over which a signal is sent from the lower order when an addition therein exceeds a certain amount; a "carry-of-zero" conductor connecting adjacent orders and over which a signal is sent from the lower order when an addition therein does not exceed a predetermined amount; a control means for each order operable by the differential means for indicating the completion of an entry in the counter of that order; a first means for each order, controlled by the counter for indicating a "carry-of-one" or a "carry-of-zero" requirement; a second means for each order coupled to the control means for that order and to the "carry-of-one" and "carry-of-zero" conductors from the lower order and operable only upon the receipt of both a signal from the control means and a carry signal from the lower order; means in an order connected to the carry conductors to the next higher order and operated by the second means upon the receipt of both signals thereby for causing a signal to be sent over one or the other conductor under control of the first means according to the carry requirement; and means to initiate an entry into said counters and to supply an impulse to one of the carry conductors to the lowest denominational order.

14. A carry device as claimed in claim 13 and in addition thereto means for restoring the first and second means to their unoperated condition, said reset means being coupled to the carry conductors from the highest order and operated by a carry signal transmitted from the highest order.

15. In a carry device for an accumulator of the type comprising a plurality of electronic counters, each representing a denominational order and capable of adding amounts, the combination of a "carry-of-one" conductor and a "carry-of-zero" conductor connecting adjacent orders, a first means for each order controlled by its related counter and operative upon completion of an addition for registering a "carry-of-one" requirement when the sum resulting from an addition in that counter exceeds a predetermined amount, or for registering a "carry-of-zero" requirement when the sum in that counter does not exceed said predetermined amount; a control means for each order operable to provide a signal that addition has been completed in the counter; a second means for each order operative independently of the first means for registering the receipt of a signal that addition in said counter has been completed and for registering the receipt of a "carry-of-one" signal or a "carry-of-zero" signal over one of the conductors from the next lower order; said second means including means for causing an addition of one in its related order upon registering the receipt of a "carry-of-one" signal and an addition completion signal; and further means for each order responsive to the combined operation of the first and second means of its related order for transmitting to the next higher order a "carry-of-one" or a "carry-of-zero" signal over the proper one of said two conductors as required by the operation of the first means.

16. In an electronic accumulator, a plurality of counters, one for each denominational order, each counter comprising an adding circuit, a carry circuit and a control circuit, a first means in the carry circuit operative upon the completion of an addition for registering a "carry-of-one" requirement when the sum resulting from the addition of two digital values by the adding circuit exceeds a predetermined amount and requires an addition of one in the counter of the next higher denominational order, or for registering a "carry-of-zero" requirement when the sum resulting from an addition of two digital values in the adding circuit does not exceed said predetermined amount and no addition is required in the counter of the next higher denominational order, a second means in the carry circuit operative independently of the first means for registering receipt of a "carry-of-one" signal or a "carry-of-zero" signal from the lower order and a completion-of-operation signal from the control means, and means responsive to a signal from said second means and controlled by said first means according to the requirement registered thereby for transmitting a signal representing the "carry-of-one" or "carry-of-zero" resulting from an addition to said counter of the next higher denominational order.

17. In an electronic accumulator, a counter for each denominational order comprising an adding circuit, a carry circuit and a control circuit, a first means in the carry circuit operative upon the completion of an addition for registering a "carry-of-one" requirement when the sum resulting from the addition of two digital values by the adding circuit exceeds a predetermined amount and requires an addition of one in the counter of the next higher denominational order, or for registering a "carry-of-zero" requirement when the sum resulting from an addition of the two digital values in the adding circuit does not exceed said predetermined amount and no addition is required in the counter of the next higher denominational order, a second means in the carry circuit operative independently of the first means for registering the receipt of either one of two carry signals indicative of a "carry-of-one" requiring the addition of one, or indicative of a "carry-of-zero" requiring no addition, a third means in the carry circuit responsive to a signal derived from the combined operation of the control circuit and the second means and controlled by the first means for transmitting the "carry-of-one" or "carry-of-zero" resulting from an addition to the counter of the next higher denominational order, and means in said carry circuit for delaying the operation of said third means until a count of one has been added when said received carry signal is a "carry-of-one."

18. In an electronic accumulator, a counter for each denominational order comprising an adding circuit, a carry circuit including three pairs of trigger tubes, a control circuit and a reset circuit, a first means in the carry circuit comprising one of said pairs of trigger tubes which is controlled by the adding circuit and is operative upon the completion of an addition for registering a "carry-of-one" requirement when the sum resulting from the addition of two digital values by the adding circuit exceeds a predetermined amount and requires an addition of "one" in the counter of the next higher denominational order, or for registering a "carry-of-zero" requirement when the sum resulting from an addition of two digital values does not exceed said predetermined amount and no addition is required in the counter of the next higher denominational order, a second means in the carry circuit comprising the other two pairs of trigger tubes and operative independently of the first means for registering the receipt of a "carry-of-one" signal from the next lower order requiring the addition of one, or a "carry-of-zero" requiring no addition, means in the control circuit for generating a signal when the adding circuit completes an addition for operating both pairs in said second means, a third means in the carry circuit controlled by the adding circuit according to whether a "carry-of-one" or a "carry-of-zero" is required by the addition and responsive to the operation of the second means for transmitting the carry of one or zero resulting from an addition to the counter of the next higher denominational order, means for delaying the operation of the third means when a carry is to be effected in an order, means operated by the trigger pair which receives the "carry-of-one" signal when the trigger pair has received a carry signal and a completion-of-addition signal for adding a count of "one" to the adding tubes when the received carry signal is a carry of one and then controlling the delaying means to send out a carry signal of one or zero depending upon the sum resulting from the final addition in the adding circuit, and means in said reset circuit for preventing a false addition of "one" when said carry circuit is reset at a time when the received carry signal was a carry of zero.

19. In an electronic accumulator, a counter for each denominational order comprising an adding circuit, a carry circuit including two pairs of trigger tubes having normal settings and a driving tube for adding a count to the adding circuit, a control circuit including a pair of trigger tubes operative when an addition is completed, and a reset circuit, a circuit responsive to the operation of the control trigger tubes upon addition-completion for operating both pairs of trigger tubes in the carry circuit, an in-carry circuit operative independently of the control circuit for operating one of the two pairs of trigger tubes in the carry circuit to register an in-carry of zero requiring no addition, an in-carry circuit operative independently of the control circuit for operating the other of the two pairs of trigger tubes in the carry circuit to register an in-carry of one requiring the addition of one in the adding circuit, means controlled by the adding circuit according to the "carry-of-one" or "carry-of-zero" requirement and rendered operative only when a pair of trigger tubes in the carry circuit has been operated by both the control circuit and the in-carry registration, for sending out an out-carry signal of one or zero depending upon the carry requirement resulting from an addition, means controlled by the reset circuit for resetting the trigger tubes to their normal setting, and means in said reset circuit for preventing the false operation of said driving tube when said reset circuit is operated.

20. In a carry device for a calculator having a main operation control circuit and a multi-denominational accumulator containing an adding circuit for each denomination, the combination of a "carry-of-one" conductor and a "carry-of-zero" conductor for connecting adjacent orders, a carry circuit for each order including two pairs of trigger tubes having normal settings and a driving tube for adding an in-carry count of one to the adding circuit, a control circuit for each order including a pair of trigger tubes operative when an addition is completed in that order, and a reset circuit adapted to be operated by the main operation control circuit, a circuit in each order responsive to the operation of the control trigger tubes upon addition-completion for operating both pairs of trigger tubes in the carry circuit, an in-carry circuit in each order operative independently of the associated control circuit for operating one or the other of the two pairs of trigger tubes in the carry circuit to register an in-carry signal of zero received from the next lower order over one of the carry conductors requiring no addition, or for operating the other of the two pairs of trigger tubes in the carry circuit to register an in-carry signal of one received from the next lower order over the other of the carry conductors requiring the addition of one in the adding circuit, means in each order controlled by the adding circuit according to the "carry-of-one" or "carry-of-zero" requirement resulting from an addition and rendered operative only when a pair of trigger tubes in the carry circuit has been operated by both the control circuit and the in-carry registration for sending an out-carry signal to the next higher order of one or zero over one or the other of the carry conductors depending upon the sum resulting from an addition, means controlled by the reset circuit of each order for resetting the trigger tubes of that order to their normal setting and for preventing the false operation of the driving tube, and means in the main operation control circuit for operating said reset circuits in all said orders when the calculation is completed in all said orders.

21. An electronic counter comprising an adding circuit, a carry circuit including two electronic devices each arranged to operate in a cycle, a driving tube for adding an in-carry count of one to the adding circuit, a control circuit and a reset circuit, means rendered operative by the control circuit when an addition is completed for operating the two electronic devices in the carry circuit through one-half of their cycles, an in-carry circuit operative independently of the control circuit for operating one of the electronic devices in the carry circuit through one-half of its cycle to register an in-carry of zero requiring no addition, or for operating the other of the electronic devices in the carry circuit through one-half of its cycle to register an in-carry of one requiring the addition of one in the adding circuit, means rendered operative only when one of the electronic devices in the carry circuit completes a full cycle for sending an out-carry signal of one or zero depending upon the sum resulting from an addition, or when the other of the electronic devices in the carry circuit completes its full cycle for operating the driving tube to add one to the adding circuit and thereupon to send an out-carry signal of one or zero depending upon the sum resulting from an addition, and means in said reset circuit for causing said electronic device that has not completed its full cycle to operate through its uncompleted half cycle.

22. An electronic counter comprising an adding circuit, a carry circuit including a first and second electrically operated device each arranged to operate in a cycle and a driving tube for adding an in-carry count of one to the adding circuit, a control circuit and a reset circuit, means rendered operative by the control circuit when an addition is completed for operating both electrically operated devices in the carry circuit through one-half of their cycles, an in-carry circuit operative independently of the control circuit for operating the first electrically operated device in the carry circuit through one-half of its cycle to register an in-carry of zero requiring no addition, or for operating the second electrically operated device in the carry circuit through one-half of its cycle to register an in-carry of one requiring the addition of one in the adding circuit, means rendered operative only when the first electrically operated device in the carry circuit completes a full cycle of operation for sending an out-carry signal of one or zero depending upon the sum resulting from an addition, or when the second electrically operated device in the carry circuit completes its full cycle for operating the driving tube to add one to the adding circuit and thereupon sending an out-carry signal of one or zero depending upon the sum resulting from an addition, means in the reset circuit for causing the electrically operated device in the carry circuit that has not completed its full cycle to operate through its uncompleted half-cycle, and means in said reset circuit for preventing the operation of said driving tube when said second electrically operated device is operated through its last half-cycle by said reset circuit.

23. In a carry device for a calculator having a main operation control circuit and a multi-denominational accumulator containing an adding circuit for each denomination, the combination of a "carry-of-one" conductor and a "carry-of-zero" conductor for connecting adjacent orders, a carry circuit for each order including a first and second electrically operated device each arranged to operate in a cycle and a driving tube for adding an in-carry count of one to the adding circuit, a control circuit for each order operable to provide a signal that addition has been completed in that order, a reset circuit for each order, means in each order responsive to the operation of the control circuit within the order for operating both electrically operated devices in the carry circuit through one-half of their cycles when an addition is completed, an in-carry circuit in each order operative independently of the associated control circuit for operating the first electrically operated device in the carry circuit through one-half of its cycle to register an in-carry of zero received over the corresponding carry conductor requiring on addition, or for operating the second electrically operated device through one-half of its cycle to register an in-carry of one received over the other of the carry conductors requiring the addition of one to the adding circuit, means to enable said second electrically-operated device to cause the driving tube to operate when the second device makes a complete cycle of operation, means in each order controlled by the adding circuit according to the "carry-of-one" or "carry-of-zero" requirement resulting from an addition and rendered operative only when the first electrically operated device in the carry circuit completes a full cycle of operation for sending an out-carry signal of one or zero over one or the other of the carry conductors depending upon the sum resulting from an addition, or when the second electrically operated device in the carry circuit completes its full cycle for operating the driving tube to add one to the adding circuit and thereupon sending an out-carry signal of one or zero over one or the other of the carry conductors depending upon the sum resulting from an addition, means in the reset circuit of each order for causing either electrically operated device to operate through its uncompleted half-cycle and for preventing the operation of the driving tube if the second electrically operated device in the carry circuit is reset and operated through its last half-cycle, and means in said main operation control circuit for operating the said reset circuits in all said orders when the entries have been completed in all said orders.

SAMUEL B. WILLIAMS.

REFERENCES CITED

The following references are of record in the file of this patent:

UNITED STATES PATENTS

| Number | Name | Date |
|---|---|---|
| 2,326,401 | Sincerbeaux | Aug. 10, 1943 |
| 2,394,925 | Luhn | Feb. 12, 1946 |
| 2,404,739 | Mumma | July 23, 1946 |
| 2,470,716 | Overbeck | May 17, 1949 |
| 2,484,115 | Palmer et al. | Oct. 11, 1949 |
| 2,485,825 | Grosdoff | Oct. 25, 1949 |
| 2,502,360 | Williams | Mar. 28, 1950 |